(12) United States Patent
Christopher

(10) Patent No.: US 7,523,216 B1
(45) Date of Patent: Apr. 21, 2009

(54) SYSTEM AND METHOD FOR USING AN ENDIAN-NEUTRAL DATA PACKET TO DEFINE SUBSEQUENT DATA PACKET BYTE-ORDER

(75) Inventor: Philip J. Christopher, Chapel Hill, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 1291 days.

(21) Appl. No.: 10/061,626

(22) Filed: Feb. 1, 2002

(51) Int. Cl.
G06F 15/16 (2006.01)
(52) U.S. Cl. ...................................... 709/236
(58) Field of Classification Search ................. 370/394; 709/230, 227–228, 236–237, 245; 710/244; 711/122, 135, 145, 207; 712/300
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,826,017 A * | 10/1998 | Holzmann | 709/230 |
| 5,931,918 A | 8/1999 | Row et al. | |
| 5,941,972 A | 8/1999 | Hoese et al. | |
| 6,065,037 A | 5/2000 | Hitz et al. | |
| 6,202,146 B1 * | 3/2001 | Slaughter et al. | 713/1 |
| 6,295,561 B1 * | 9/2001 | Nagy | 709/246 |
| 6,425,035 B2 | 7/2002 | Hoese et al. | |
| 6,434,625 B1 * | 8/2002 | Loen | 709/236 |
| 6,493,343 B1 * | 12/2002 | Garcia et al. | 370/394 |
| 6,728,874 B1 * | 4/2004 | Sijstermans et al. | 712/300 |
| 6,952,715 B1 * | 10/2005 | Kronz | 709/203 |
| 2002/0069339 A1 * | 6/2002 | Lasserre et al. | 711/201 |
| 2003/0028866 A1 * | 2/2003 | Long | 717/154 |

OTHER PUBLICATIONS

Virtual Interface Architecture Specification, Version 1.0, published by a collaboration between Compaq Computer Corp., Intel Corp., and Microsoft Corp., Dec. 16, 1997.

DAFS: Direct Access File System Protocol, Version 1.0, by Network Appliance, Inc., Sep. 1, 2001.

Common Internet File System (CIFS) Version: CIFS-Spec 0.9 Storage Networking Industry Association (SNIA), Draft SNIA CIFS Documentation Work Group Work-in-Progress, Revision Date: Mar. 26, 2001.

(Continued)

*Primary Examiner*—Salad Abdullahi
(74) *Attorney, Agent, or Firm*—Cesari and McKenna LLP (57) ABSTRACT

A system and method for defining data packet byte order is provided, which utilizes the exchange of endian-neutral data packets between computers or network devices connected to each other via a network connection. After opening the network connection, the client computer sends client information to the server computer. Included within this client information is the endianness of the client computer. In response, the server computer sends a server information packet to the client, which contains the server endianness. After the exchange of these data packets, future data transfers between the networked computers can be translated into the proper endianness of the receiving computer.

3 Claims, 6 Drawing Sheets

OTHER PUBLICATIONS

Virtual Interface Architecture Specification Version 1.0; Dec. 16, 1997.

Intel Virtual Interface (VI) Architecture Developer's Guide Revision 1.0; Sep. 9, 1998.

VIDF Extensions to VIPL-1.0 Revision A; Sep. 14, 2001.

American National Standards Institute, Inc., American National Standard for Information Technology, Fibre Channel Arbitrated Loop (FC-AL-2); Information Technology Industry Council, Dec. 8, 1999.

DAFS: Direct Access File System Protocol, Version 1.00; Sep. 1, 2001.

* cited by examiner

SYSTEM AND METHOD FOR USING AN ENDIAN-NEUTRAL DATA PACKET TO DEFINE SUBSEQUENT DATA PACKET BYTE-ORDER

FIELD OF THE INVENTION

The present invention relates to networked computers, and more particularly to determining the endianness of each of a plurality of interconnected computers in a network environment.

BACKGROUND OF THE INVENTION

Computer architectures differ in their method of storing a sequence of bytes in computer memory. Each byte traditionally carries 8 bits of information. To store and process larger numbers, for example, 16-bit or 32-bit quantities, microprocessors store a sequence of bytes in a string together to produce the desired size.

The two most common methods of storing these multi-byte sequences are termed "big-endian" and "little-endian." In a big-endian computer, the most significant value in the sequence is stored first. In a little-endian computer, the least significant value is stored first. The least significant value is the byte of the sequence that is the smallest. For example, given the two-byte hexadecimal number 4F52, the least significant byte is the "52" byte.

By "first" it is meant the lowest storage address. For example, given the two-byte hexadecimal number 4F52, a big-endian computer would store this number in memory as 4F52. If, for example, the "4F" byte was stored at memory address 1000, the "52" byte would be stored at memory address 1001. Conversely, in a little-endian computer, this number would be stored as 524F, with the "52" byte stored at memory address 1000 and the "4F" byte stored at memory address 1001.

By way of example, IBM's 370 series of computers, many reduced instruction set chip (RISC) based computers and Motorola® microprocessors are big-endian. Intel® microprocessors and the former Digital Equipment Corporation (now Compaq Computer Corporation) Alpha® microprocessor are little-endian.

In both big and little-endian computers, the bits within each byte are traditionally stored in a big-endian format. While it is possible to have a little-endian bit order, most known central processing units and microprocessors are currently designed for a big-endian bit order.

The endianness of a particular computer is relevant when it is exchanging particular types of data with a computer of a differing endianness. By "endianness" it is meant the byte order that a particular computer, file server or network device utilizes, for example big or little-endian. The term "endian neutral" as used herein means a byte order that is defined so that the data stored in an endian neutral data packet can be successfully read by computers of varying endianness. For example, a byte is endian neutral by definition as both big-endian and little-endian computers will properly read the data. Most data transfer protocols and file formats have a set endianness for use with the computer performing any translations as needed.

One example of this is the use of remote direct memory access (RDMA) through certain communication links such as a virtual interface (VI) connection. RDMA is a form of direct memory access, where data is moved directly from a memory location on a first computer to a memory location on a second computer without significant intervention by processes of the central processing unit of either computer. Virtual interface (VI) is a standard for an architecture for connecting between high performance network hardware and computer systems. The VI architecture is defined in *Virtual Interface Architecture Specification, Version* 1.0, published by a collaboration between Compaq Computer Corp., Intel Corp., and Microsoft Corp., which is hereby incorporated by reference.

To use the RDMA read/write capabilities implemented under the VI architecture, the source computer must supply to the VI interface the source address of the data to be transferred and the destination address on the remote computer for the data. Under the VI architecture, this remote address must be specified in the proper endianness of the remote computer. This requirement allows the remote computer to simply use the received address as a memory address on the remote machine without further processing. In a homogenous networking environment, where all computers involved share the same endianness, this requirement is easily met. However, a need arises to determine the proper endianness of the computer to which a given computer is connected when all computers in a given network do not share the same endianness.

SUMMARY OF THE INVENTION

The present invention overcomes the disadvantages of the prior art by providing a system and method for determining the endianness of each of the computers connected over a bi-directional, point to point connection, such as a VI connection. After a protocol connection phase, where the network connection is opened according to the appropriate protocol architecture standard, a novel handshaking phase occurs, where each of the computers transmits a packet of information including the transmitter's endianness. In one embodiment this information packet is transmitted using an endian neutral format, such as a binary flag. At the end of the handshaking phase, each of the interconnected computers knows of the other's endianness. Thus, later information to be exchanged between the two computers, in a message passing phase, that needs to be in a proper endian format, e.g., RDMA remote addresses, can be properly formatted by the sending computer before transmission.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 1:
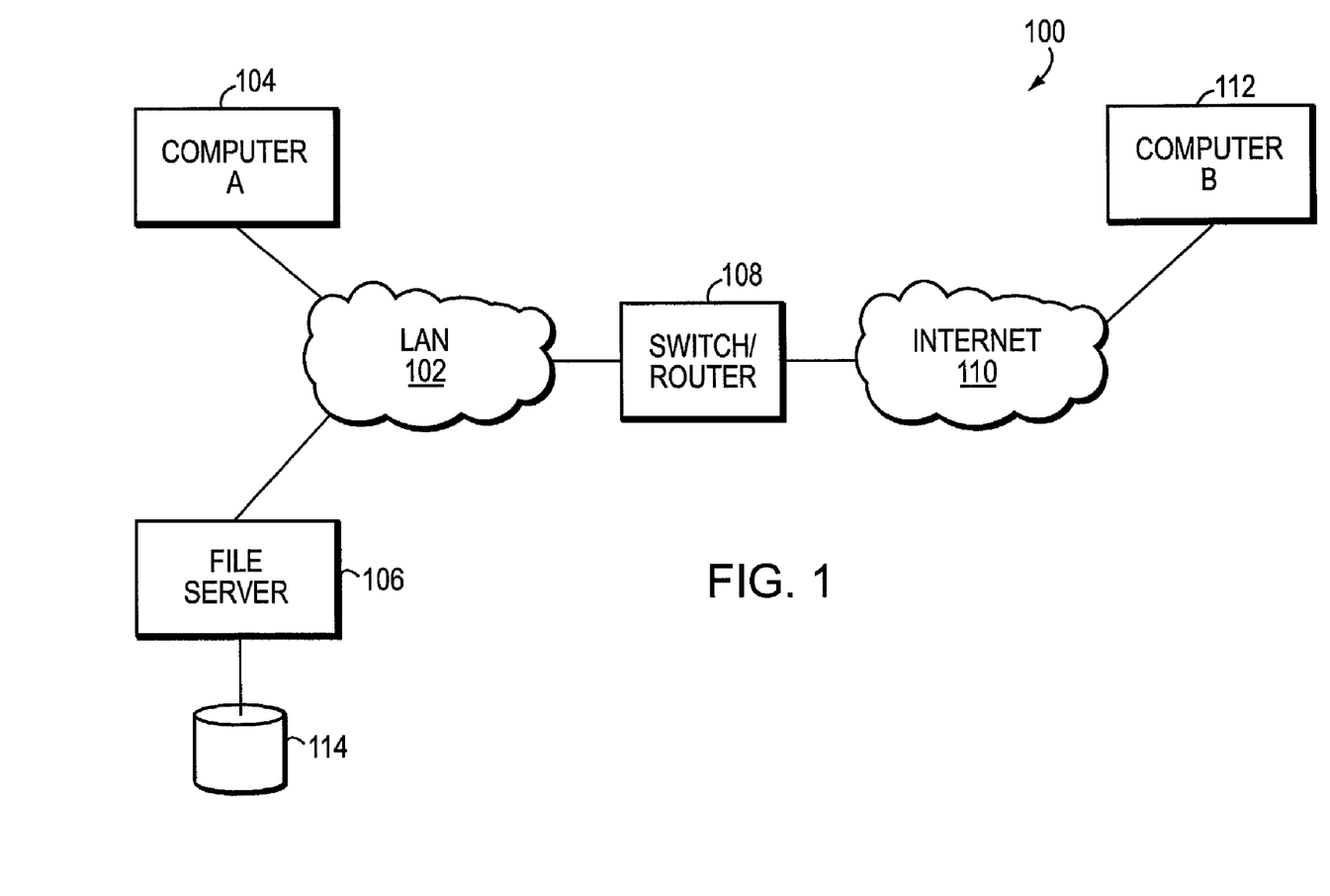
FIG. 1 is a schematic block diagram of an exemplary network environment.

FIG. 1 is a schematic block diagram of an exemplary network environment 100 in which the principles of the present invention are implemented. The network 100 is based around a local area network (LAN) 102 interconnection. However, a wide area network (WAN), virtual private network (VPN) utilizing communication links over the Internet, for example, for a combination of LAN, WAN and VPN implementations can be established. For the purposes of this description, the term LAN should be taken broadly to include any acceptable networking architecture. The LAN interconnects various devices such as Computer A 104 and a file server 106. Also interconnected to the LAN may be a switch/router 108, which provides a gateway to the well-known Internet 110. Computer B 112 may be connected to the Internet 110. As used herein, the word computer should be taken to mean any network device that contains a microprocessor and is capable of transmitting and receiving information over a network. Examples of computers include, but are not limited to, file servers or other types of network servers, traditional networked computers, network appliances, switches, routers and network caches. It should be noted that this network environment is exemplary only and that the principles of the present invention can be applied to any networking environment including any number of computers, file servers or other network devices.

Each device connected to either the LAN 102, or the well-known Internet 110, includes a network interface controller (not shown) which provides the mechanical, electrical and signaling circuitry to connect the device to other devices over the network.

B. File Servers and Computers

Figure 2:
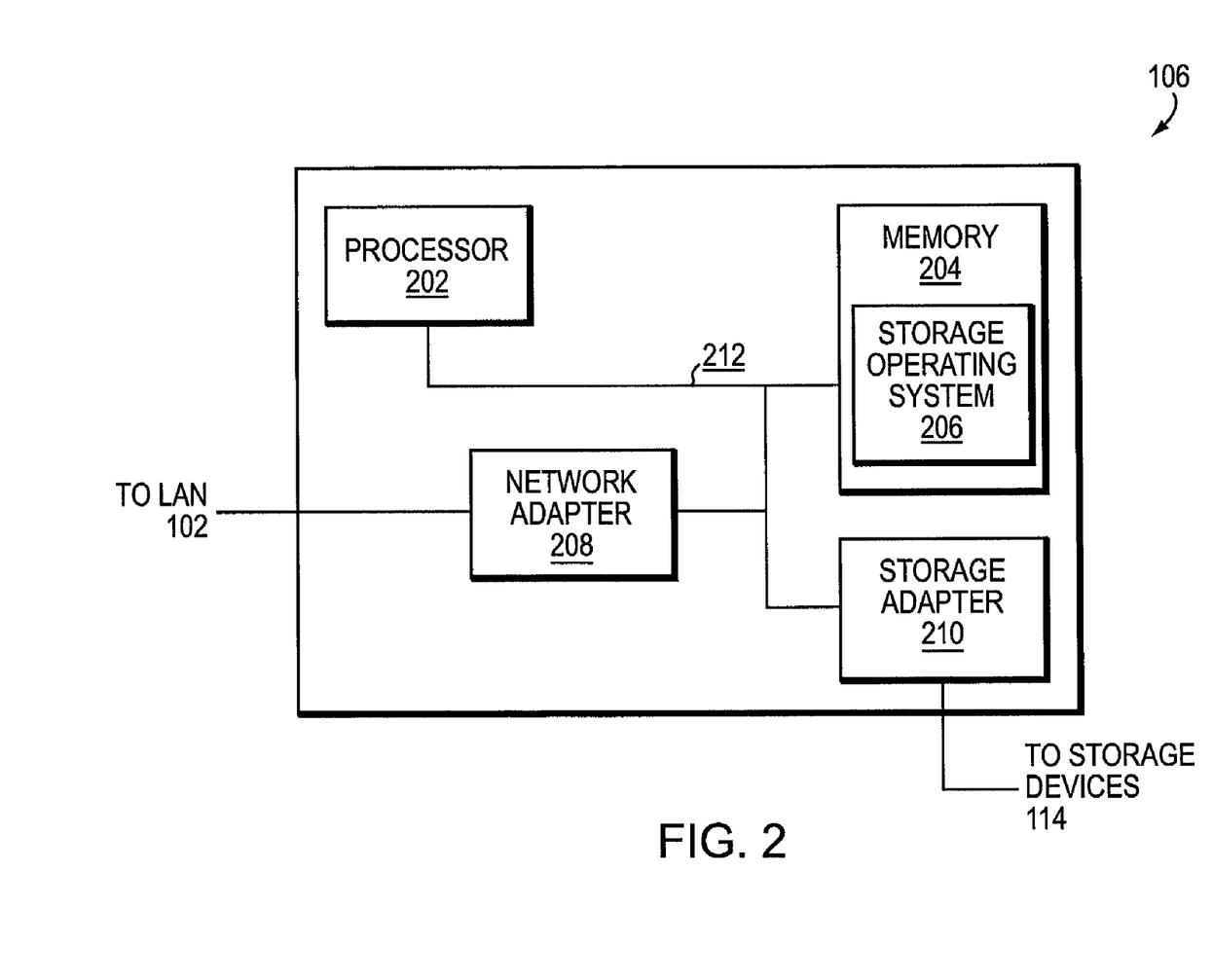
FIG. 2 is a more-detailed schematic block diagram of an exemplary file server in accordance with FIG. 1.

FIG. 2 is a more-detailed schematic block diagram of an exemplary file server 106 that is advantageously used with the present invention. Other file servers can have similar construction. By way of background, a file server or filer is a special-purpose computer that provides file service relating to the organization of information on storage devices, such as disks. However, it will be understood by those skilled in the art that the inventive concepts described herein may apply to any type of special-purpose computer or general-purpose computer. The file server comprises a processor 202, a memory 204, a network adapter 208 and a storage adapter 210 interconnected by a system bus 212. The file server also includes, within memory, an operating system 206 that implements the file system to logically organize the information as a hierarchical structure of directories and files on the disks.

In the illustrative embodiment, the memory 204 may have storage locations that are addressable by the processor and adapters for storing software program code where data structures associated with the present invention. The processor and adapters, may in turn, comprise processing elements and/or logic circuitry configured to execute the software code and manipulate the data structures. The operating system 206, portions of which are typically resident in memory and executed by the processing elements, functionally organize a file server by invoking storage operations in support of a file service implemented by the filer. It will be apparent to those skilled in the art that other processing and memory implementations, including various computer-readable media, may be used for storing and executing program instructions pertaining to the inventive technique described herein.

The network adapter 208 comprises the mechanical, electrical and signaling circuitry needed to connect the file server to a client over the computer network, which as described generally above, can comprise a point-to-point connection or a shared medium such as a LAN. A client can be a general-purpose computer configured to execute applications including file system protocols, such as the Common Internet File System (CIFS) protocol, the Network File System (NFS) protocol or the Hypertext Transfer Protocol (HTTP). Moreover, the client can interact with the file server in accordance with the client/server model of information delivery. The storage adapter cooperates with the operating system 206 executing in the file server to access information requested by the client.

The storage adapter 210 includes input/output (I/O) interface circuitry that couples to the disks over an I/O interconnect arrangement such as a conventional high-speed/high-performance fibre channel serial link topology. The information is retrieved by the storage adapter, and if necessary, processed by the processor (or the adapter itself) prior to being forwarded over the system bus to the network adapter, where the information is formatted into a packet and returned to the client.

To facilitate access to the disks, the operating system 206 implements a file system that logically organizes the information as a hierarchical structure of directories in files on the disks. Each on-disk file may be implemented as a set of disk blocks configured to store information such as text, whereas the directory may be implemented as a specially formatted file in which other files and directories are stored. In the illustrative embodiment described herein, the storage operating system associated with each volume is preferably the NetApp® Data ONTAP™ operating system available from Network Appliance Inc. of Sunnyvale, Calif. that implements a Write Anywhere File Layout (WAFL) file system. The preferred operating system for the exemplary file server is now described briefly. However, it is expressly contemplated that the principles of this invention can be implemented using a variety of alternate operating system architectures. Additionally, while this description is in terms of file servers, it should be noted that the teachings of this invention can be applied to any suitable network device or computer.

C. Operating System

Figure 3:
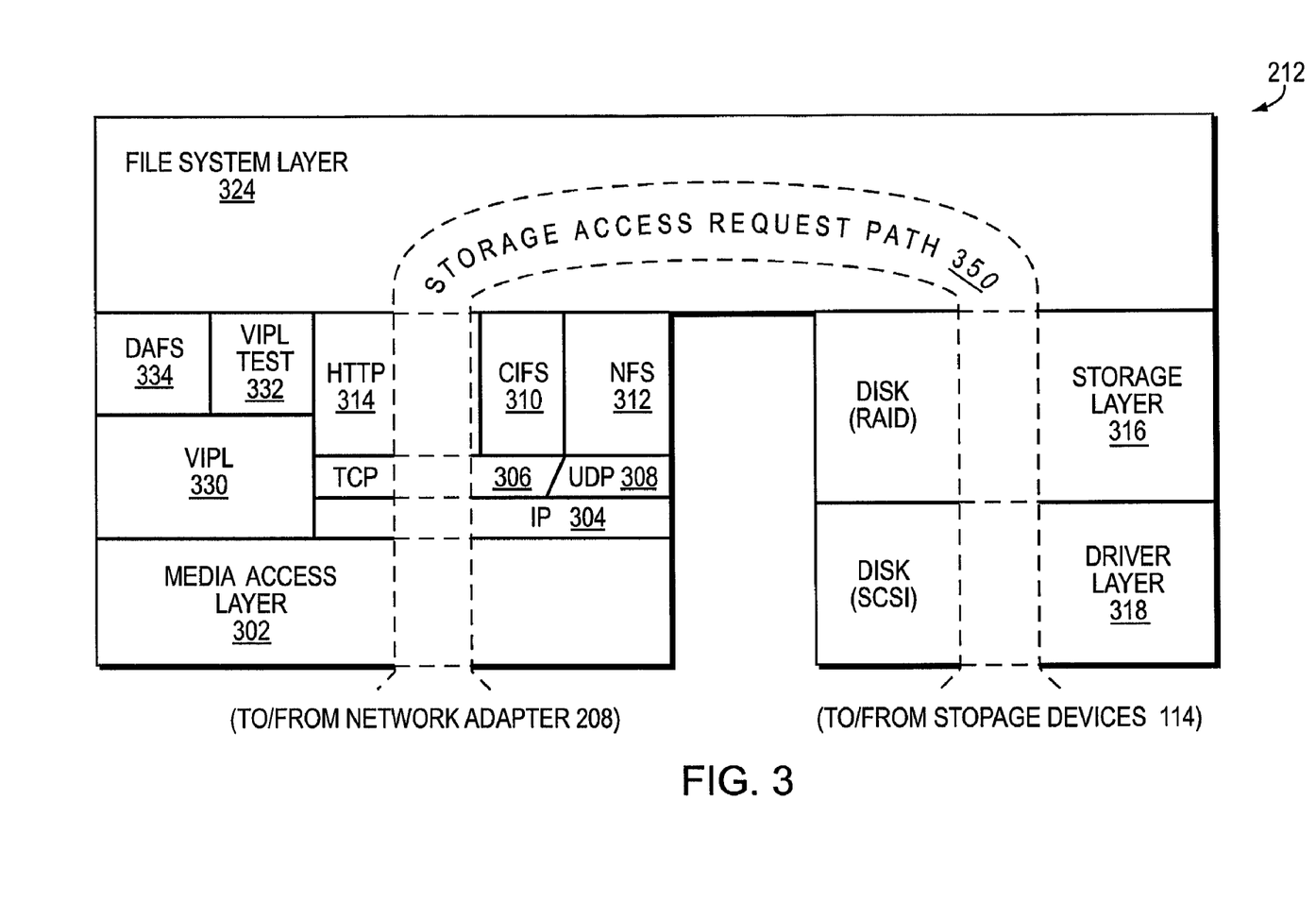
FIG. 3 is a schematic block diagram of an operating system for use with the exemplary file server of FIG. 2 in accordance with an embodiment of this invention.

As shown in FIG. 3, the exemplary operating system 206 comprises a series of software layers including a media access layer 302 of network drivers (e.g., Ethernet, Fibre Channel, InfiniBand™). The storage operating system further includes network protocol layers such as the IP layer 304 and its TCP layer 306 and a UDP layer 308. A virtual interface provider library layer (VIPL) 330 implements the virtual interface architecture. A VIPL test layer 332, described further below, provides a series of testing routines to test the implementation of the virtual interface provider library. A file system protocol layer provides multi-protocol data access and, to that end, includes support from the CIFS protocol 310, the Network File System (NFS) protocol 312, the HTTP protocol 314 and the Direct Access File System (DAFS) protocol 334.

In addition, the operating system 206 includes a disk storage layer 316 that implements a disk storage protocol such as a Redundant Array of Independent Disks (RAID) protocol, and a disk driver layer 318 that implements a disk access protocol, such as e.g., a Small Computer System Interface (SCSI) protocol.

Bridging the disk software layers with the network and file system protocol layers is a file system layer 324 of the storage operating system. Generally, the file system layer 324 implements the file system having an on-disk file format representation that is block-based. The file system generates operations to load/retrieve the requested data of volumes if it is not resident "in-core", i.e., in the filer's memory. If the information is not in memory, the file system layer indexes into the inode file using the inode number to access an appropriate entry and retrieve a logical block number. The file system layer is then passes the logical volume block number to the disk storage/RAID layer, which maps out logical number to a disk block number and sends the later to an appropriate driver of a disk driver layer. The disk driver accesses the disk block number from volumes and loads the requested data into memory for processing by the filer. Upon completion of the request, the filer and operating system return a reply, e.g., a conventional acknowledgement packet defined by the appropriate file access protocol specification, to the client over the network. It should be noted that the software "path" 350 through the storage operating system layers described above, needed to perform data storage access for the client received the filer, may ultimately be implemented in hardware, software or a combination of hardware and software.

The VIPL layer 330 implements the virtual interface provider library as defined in the above-incorporated specification. The VIPL test layer 332, provides a series of tests that can be executed over a virtual interface to test VI implementations and system characteristics, such as, speed, latency, etc. The VIPL test layer includes routines to test various components of the VIPL layer 330.

D. VIPL Test and Endianness

The VIPL Test layer 332 incorporates various tests that can be executed over a VI connection to test a VI implementation. One example of the tests that are incorporated into the VIPL Test layer is a transaction test. The transaction test causes the two computers interconnected by the VI connection to perform various combinations of data moving commands that are available through a virtual interface connection. Some of these data moving commands include various remote direct memory access (RDMA) read and write commands, which require a memory address of the remote computer as a parameter to the command. The parameters of these RDMA commands therefore must have the proper endianness, or data packet byte order, with respect to the remote computer.

To begin a VIPL test routine, the user or administrator executes a command on a computer that has both VIPL and VIPL test. This command, arbitrarily called "vipltest," can be executed from a command line interface (CLI), a graphical user interface (GUI) or another method of executing a command on a computer. The vipltest command, in one embodiment, implements the VIPL Test protocol. Once the vipltest command has been is executed on a particular computer without any options or parameters, that computer enters a vipltest server mode and listens for a VI connection request.

The user or administrator then proceeds to execute the vipltest command on another computer. When the user executes the vipltest command on the second computer, a variety of options and parameters can be selected to define what tests are to be run between the two computers. For the purposes of this description, this second computer, which executes the vipltest command, is deemed to be the client.

Figure 4:
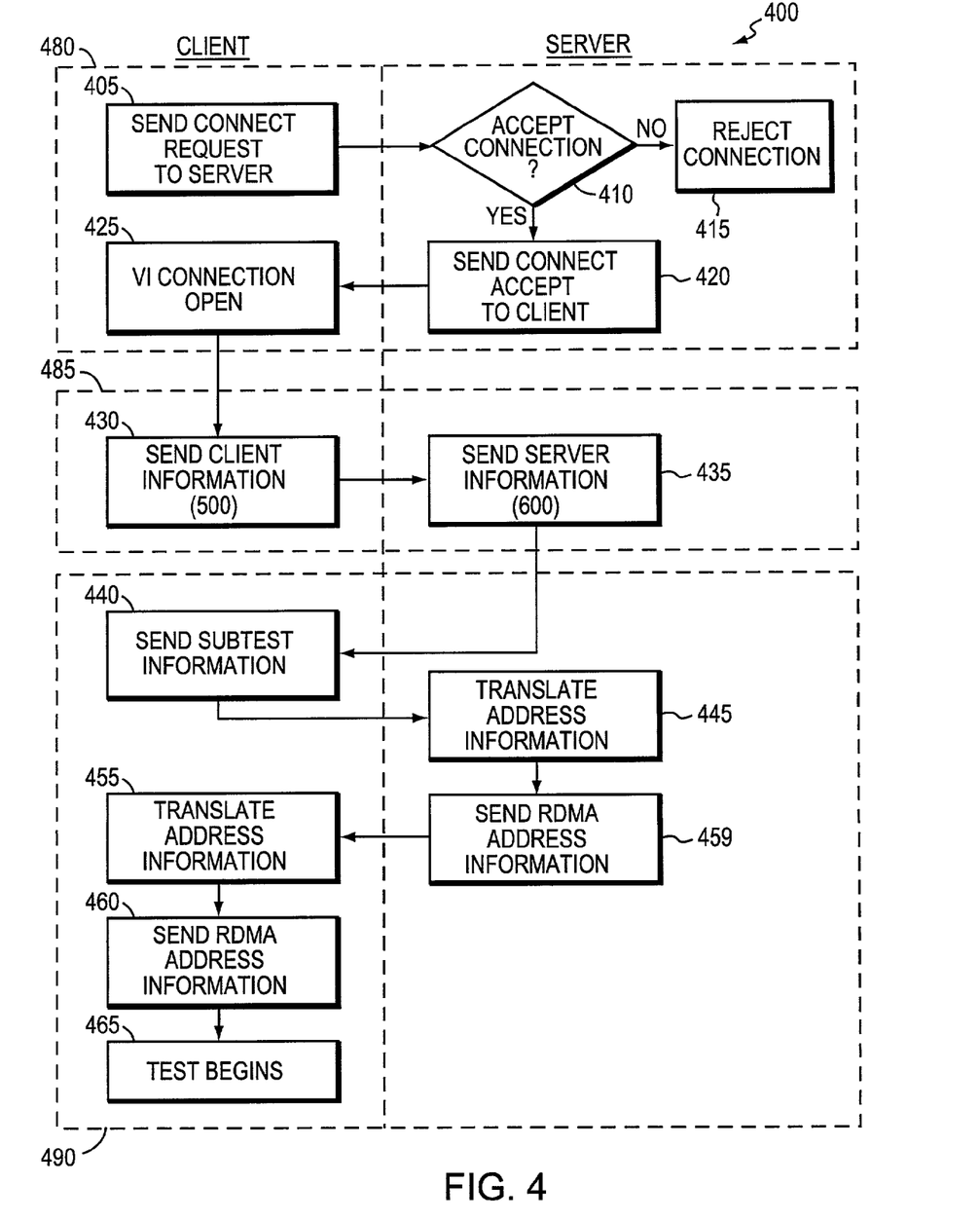
FIG. 4 is a flowchart showing the procedure performed by a client and server to define the endianness of subsequent byte packets in accordance with one embodiment of the invention.

FIG. 4 is a flowchart of the procedure 400 followed by the exemplary client and server to exchange their respective endiannesses under one embodiment of the invention.

This procedure 400 is divided into three stages including a protocol connection phase 480, an endianness handshaking phase 485 and a message passing phase 490. The following illustrative embodiment shows these three phases in a VIPL Test environment. It should be noted that it is expressly contemplated that other environments can be utilized in accordance with the teachings of this invention.

The protocol connection stage 480 can be generalized as the opening of the networking connection between the client and server. In the illustrative embodiment the client and server are utilizing the virtual interface architecture for networking. In step 405 the client sends a standard VI ConnectRequest packet to the server in accordance with the virtual interface specification. The server decides whether to accept or reject the connection in step 410. If the connection is rejected, an error condition occurs in accordance with the VI standard (step 415). If the server accepts the connection, the server sends a virtual interface ConnectAccept message to the client in step 420. At this point, the protocol connection stage has been completed and the VI connection is open between the client and the server (step 425). It should be noted that in this embodiment of the invention the network connections are point to point communication links and not multicast or broadcast transmissions.

Figure 5:
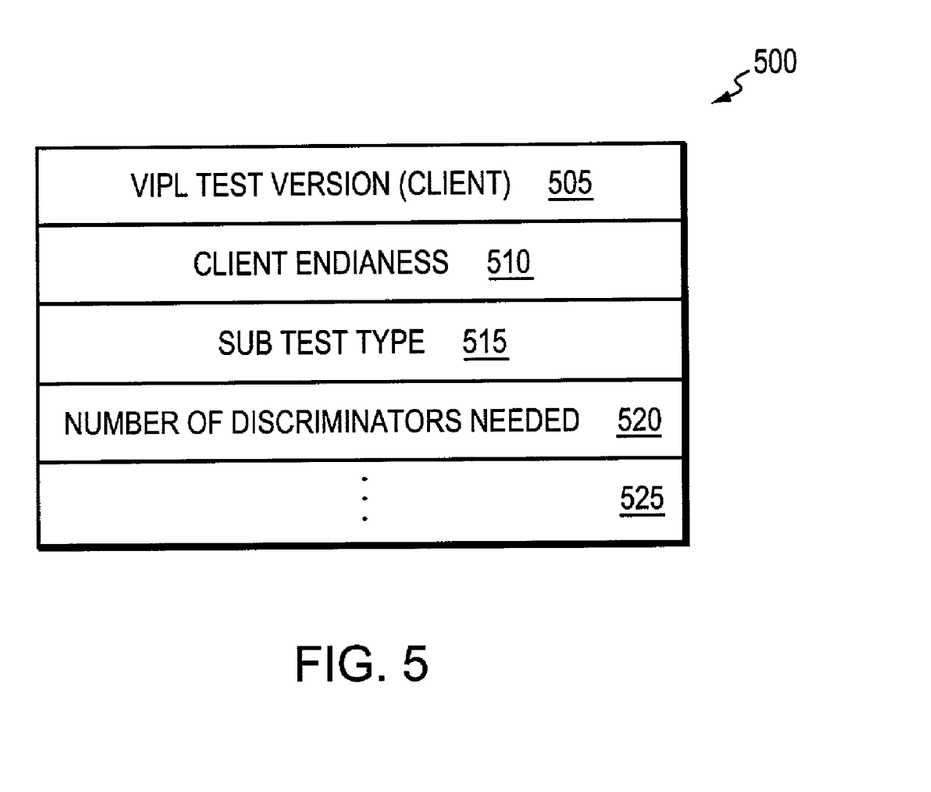
FIG. 5 is a schematic block diagram of an exemplary client information packet in accordance with FIG. 4.

In the handshaking protocol phase 485 the client sends a packet containing client information 500 to the server over the VI connection in step 430. A block diagram of one embodiment of this client information packet 500 is shown in FIG. 5. The client information packet 500 includes various fields, including a Client VIPL Test Version field 505, a Client Endianness filed 510, a Test Type field 515, a Number of Discriminators Needed field 520 and, in alternate embodiments, various other fields 525. The Client VIPL Test Version field 505, identifies the version of the VIPL Test protocol that the client is running. In some embodiments of VIPL Test, both the client and server should be running the same protocol version of the software for a test to execute. The Client Endianness field 510 defines the endianness of the client computer. In one embodiment, this field can be a binary flag defined so that if the value of the field is TRUE, the client is little endian. If the value of the flag is FALSE the client is big-endian. The Test Type field 515 describes the types of subtest routines that are to be run in this test. The Number of Discriminators Needed field 520 alerts the server to the number of discriminators that will be needed to properly execute the subtests. In one embodiment, each of the subtests to be run is executed over its own VI connection, thus the Number of Discriminators Needed field 520 determines the number of VI connections that are needed.

Figure 6:
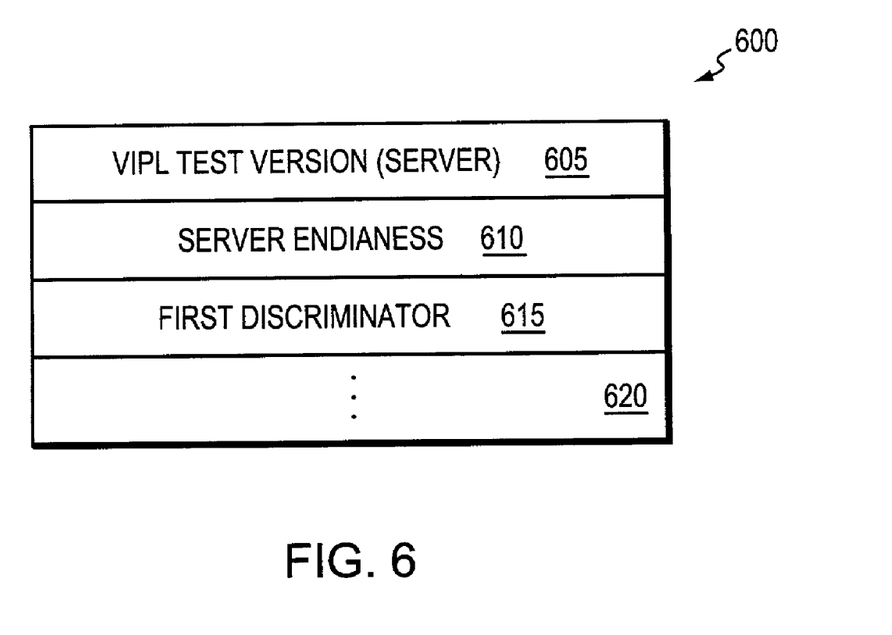
FIG. 6 is a schematic block diagram of an exemplary server information packet in accordance with FIG. 4.

In step 435, the server sends a server information packet 600 to the client in response to the receipt of the client information packet 500. An exemplary block diagram of a server information packet 600 is shown in FIG. 6. The server information packet 600 can include such fields as a Server VIPL Test Version field 605, a Server Endianness field 610, a First Discriminator field 615, and, in alternate embodiments, other fields 620. The Server VIPL Test Version field 605 identifies the version of the VIPL Test protocol that the server is running. As described above, in some embodiments of the VIPL Test software, both the client and server should be executing the same version of the protocol. The Server Endianness field 610 defines the endianness of the server. This can be implemented in various ways, including, for example, as a binary field so that a TRUE value means that the server is little endian. Similarly, if the value of the binary field is FALSE, the server is big-endian. The First Discriminator field 620 contains the information for the first virtual interface discriminator to be used in opening subtest VI connections.

After the client and server exchange their respective information packets, each of the computers involved in the transaction then "know" the other's endianness. The other computer's endianness is stored, in one embodiment, in a data structure associated with the VI discriminators used for the networking connection between the two computers. Thus, later transmitted data can be properly formatted into the correct endianness for the receiving computer. Specifically, during RDMA operations that pass a remote address as a parameter, the transmitting computer will be able to format the remote address into the proper endianness of the recipient. This formatting, which is performed by the transmitting computer in an illustrative embodiment, can be accomplished by known byte-swapping techniques. Such byte swapping generally entails determining the size in bytes of the item to be byte swapped and then performing a number of byte copies into a buffer. Each of the copy operations transfers a given byte from the original item to its proper byte location in the buffer. Once each byte from the item to be byte swapped has been translated into its proper location in the buffer, the value contained in the buffer is then forwarded as a byte-swapped result. For example, if the transmitting computer is of a different endianness than the receiving computer, any non-endian-neutral data should be byte swapped.

In the embodiment of the invention where the novel endianness handshaking occurs as part of a VIPL test routine, the message passing phase 490 begins after the server and client have exchanged their respective endianness information (see 485). The client sends subtest information in step 440. This subtest information includes the actual definitions of the tests to be performed. For example, this subtest information may list a series of RDMA writes and/or reads that are to be performed over the VI connection. In response to receipt of this information, the server translates any server addresses into the proper endianness in step 445. This translation occurs when the server and client are utilizing differing endiannesses. In such cases, the server translates its address into the client endianness before sending the server RDMA address information in step 450.

Similarly, the client performs any address translation needed in step 455. This address translation occurs when the server and client are of differing endiannesses. Here, the client translates any client addresses into the server endianness before sending the client RDMA address information in step 460. At this point, the various test can begin (step 465).

The foregoing has been a detailed description of illustrative embodiments of the invention. Various modifications and additions can be made without departing from the spirit and scope of the invention. For example, various types of network connections other than virtual interface (VI) connections can be utilized with the teachings of this invention. For example, it is expressly contemplated that the teachings of this invention can be utilized with various network devices communicating over an InfiniBand™ networking architecture. Additionally, while the described embodiment shows the client transmitting its endianness first, it is expressly contemplated that in alternative embodiments the server would transmit the server information first. Also, it is expressly contemplated that the teachings of this invention can be utilized in environments other than a VIPL Test environment. Finally, it is expressly contemplated that any of the functions, procedures or processes described herein can be implemented using hardware, firmware or software, consisting of a computer-readable medium including program instructions executing on a computer, or a combination of hardware, firmware and/or software. Accordingly, this description is meant to be taken only by way of example, and not to otherwise limit the scope of the invention.

What is claimed is:

1. A method for establishing communication between devices on a network that utilize disparate byte order conventions referred to as endianness, comprising:

exchanging a first set of messages to establish a connection between a first device and a second device for communication during a communication session, the first and second devices serving as sending devices while the respective other of the first and second devices serves as the receiving device;

exchanging a second set of messages between the first and second devices regarding communication parameters to be used during the communication session, the second set of messages including an indicator of endianness normally used by each of the first and second devices for communication messages, wherein the endianness of a device specifies the byte order of, at least, addresses as used by the device, wherein the second set of messages use an endian neutral format;

exchanging a third set of messages containing payload data to be communicated between the first and second devices; and wherein, responsive to the endianness indicator indicating disparate byte order conventions, the sending device sends the messages of the third set of messages to the receiving device using the endianness of the receiving device.

2. The method of claim 1 further comprising establishing a point to point, bidirectional communication link between the first and second devices responsive to the first set of messages, and wherein the first set of messages comprises a protocol connection phase, the second set of messages comprise a handshaking phase and the third set of messages comprise a message passing phase.

3. The method of claim 1, wherein the payload data is used in conducting a test of communication between the first and second devices, and the messages of the third set of messages include a data request and an identification of the source address and destination address of the data.

* * * * *

UNITED STATES PATENT AND TRADEMARK OFFICE
CERTIFICATE OF CORRECTION

| | | |
|---|---|---|
| PATENT NO. | : 7,523,216 B1 | Page 1 of 1 |
| APPLICATION NO. | : 10/061626 | |
| DATED | : April 21, 2009 | |
| INVENTOR(S) | : Philip J. Christopher | |

It is certified that error appears in the above-identified patent and that said Letters Patent is hereby corrected as shown below:

In Col. 5, line 8 should read as follows:
-- layer is-then passes the logical volume block number to the --.

In Col. 5, line 51 should read as follows:
-- command has been is-executed on a particular computer --.

Signed and Sealed this
Twenty-fourth Day of July, 2012

David J. Kappos
*Director of the United States Patent and Trademark Office*